United States Patent [19]

Gohlke

[11] Patent Number: 5,326,609
[45] Date of Patent: Jul. 5, 1994

[54] EXPANSION JOINT FIRE BARRIER

[75] Inventor: Henry Gohlke, Norman, Okla.

[73] Assignee: Metalines, Oklahoma City, Okla.

[21] Appl. No.: 904,394

[22] Filed: Jun. 25, 1992

[51] Int. Cl.⁵ .......................... B32B 1/04; E04C 2/32
[52] U.S. Cl. ..................................... 428/76; 428/74;
 428/75; 428/99; 428/141; 428/156; 428/167;
 428/172; 428/174; 428/192; 428/913; 52/792
[58] Field of Search ............... 428/156, 172, 174, 131,
 428/182, 76, 184, 178, 141, 913, 192, 155, 212,
 74, 75, 167; 52/792, 809

[56] References Cited

U.S. PATENT DOCUMENTS 4,025,996  5/1977  Saveker ................... 428/594
5,032,447  7/1991  Bailey ..................... 428/184

Primary Examiner—Donald J. Loney
Attorney, Agent, or Firm—Hovey, Williams, Timmons & Collins

[57] ABSTRACT

A preferred expansion joint fire barrier includes two sheets of metal having rows of dimples defined in the respective surfaces thereof with a layer of fire resistant material between the sheets to form a fire barrier body presenting a concave configuration, and includes a pair of attachment strips extending outwardly from opposed side edges of the barrier body.

29 Claims, 3 Drawing Sheets

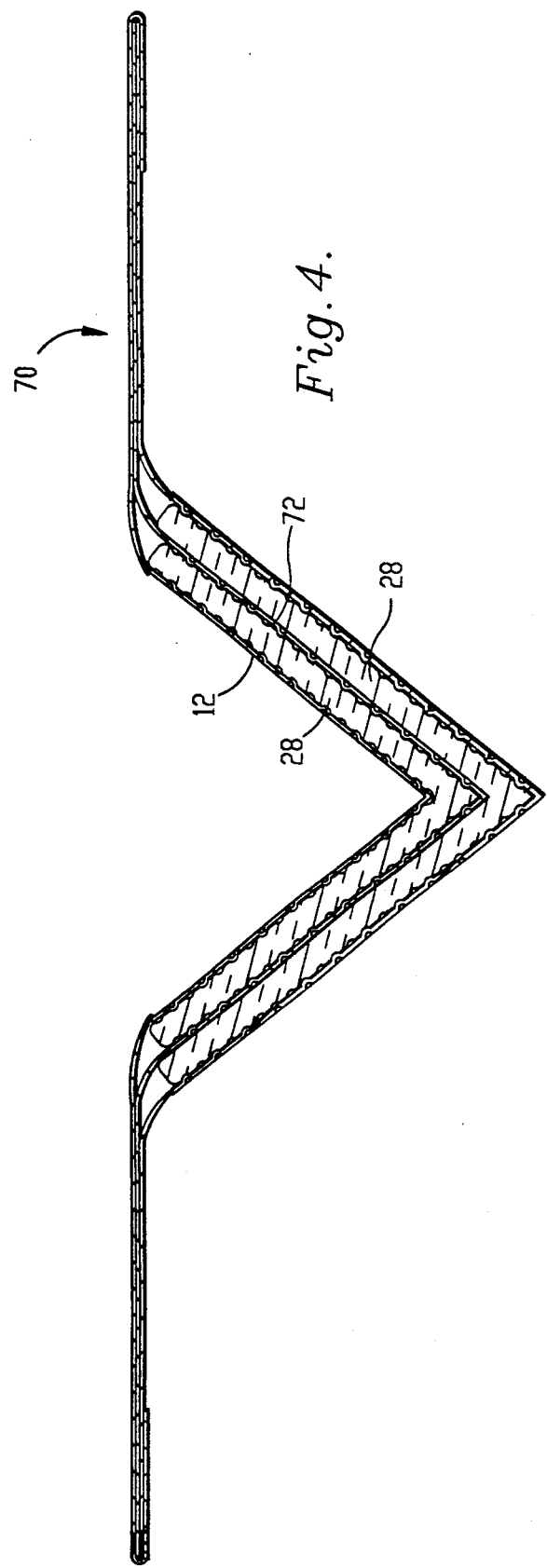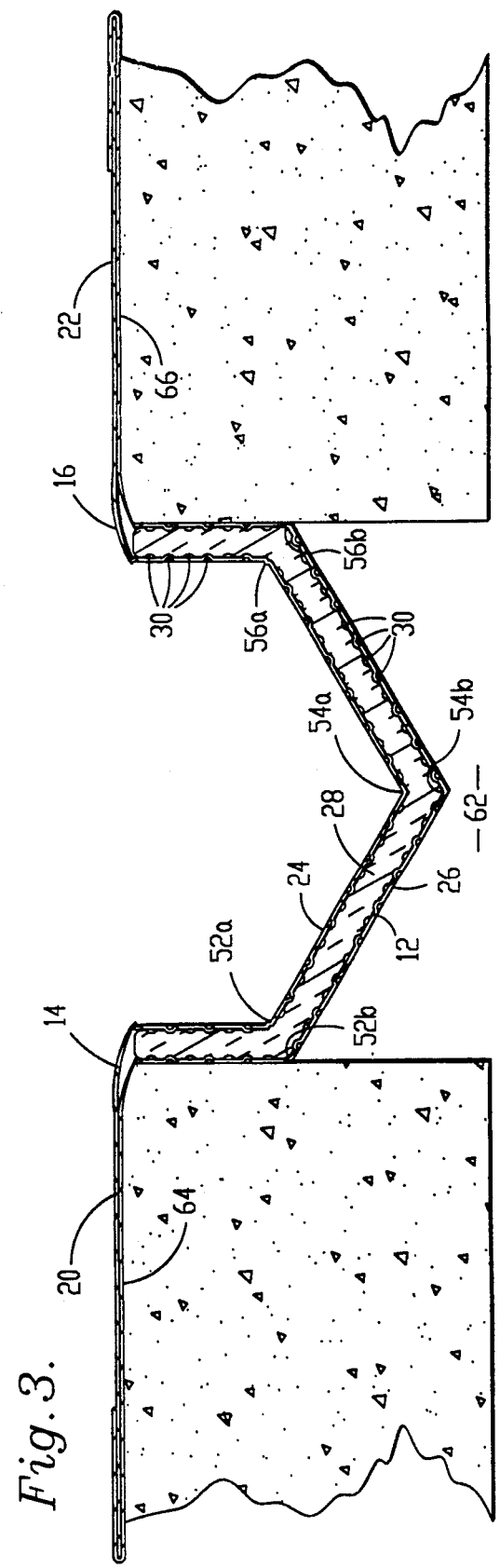

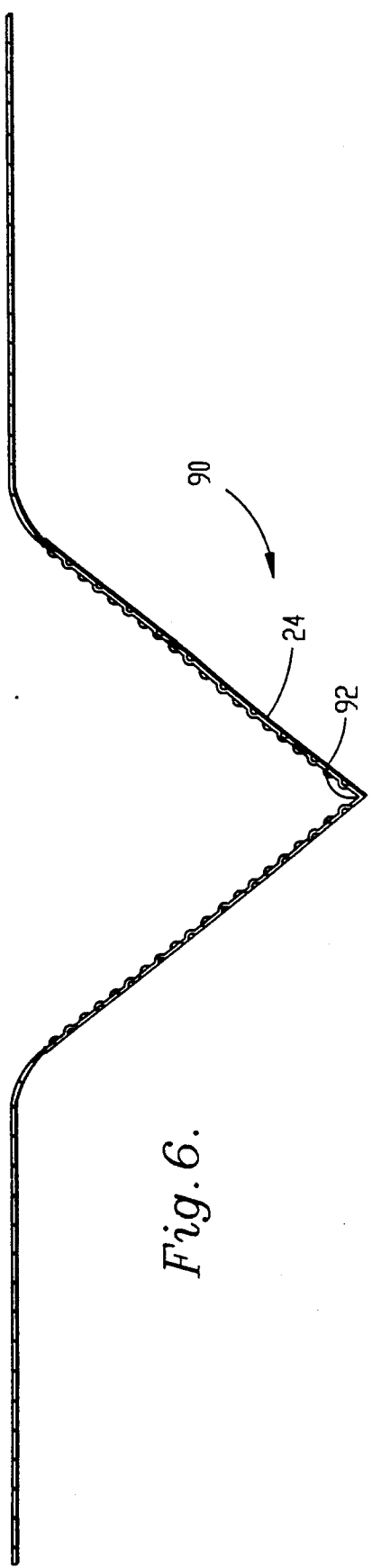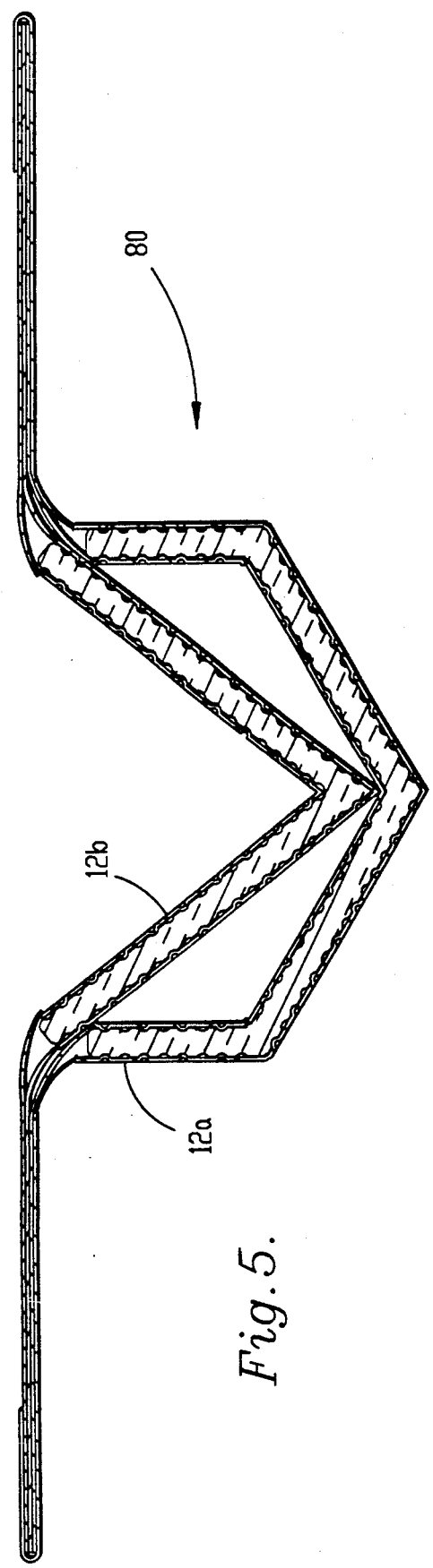

EXPANSION JOINT FIRE BARRIER

BACKGROUND OF THE INVENTION

1. Field of the Invention

The present invention is concerned with the field of expansion joint fire barriers. More particularly, it is concerned with a preferred expansion joint fire barrier including two sheets of metal having rows of dimples defined in the respective surfaces thereof with a layer of fire resistant material between the sheets to form a fire barrier body presenting a concave configuration, and including a pair of attachment strips extending outwardly from opposed side edges of the barrier body.

2. Description of the Prior Art

One type of expansion joint fire barrier presents a layered construction composed of two sheets of stainless steel with fire resistant material therebetween forming a barrier body with attachment strips extending from side edges. Usually this type of barrier is longitudinally scored so that the barrier body can be formed into a concave configuration for placement into the gap of an expansion joint.

This type of fire barrier is normally manufactured in a planar configuration and then formed into a roll for shipment. On site, the barrier is unrolled and placed over the expansion joint gap. The barrier body is then formed into the concave configuration as defined by the score lines and placed in the gap. The attachment strips are then secured to the edges of the joint structure.

If smooth sheet metal is use to form the outer layers of the body, undesirable and randomly oriented creases develop in the sheet metal during formation into a roll and especially when it is unrolled on site. U.S. Pat. No. 5,032,447 discloses a fire barrier intended to solve this problem with corrugated outer sheet metal layers but, in so doing, presents problems of its own.

For example, corrugated material inherently requires an initial surface area greater than the final over all surface area of the barrier, which increases the cost of the barrier especially when high grade stainless steel is used. Additionally, the score lines are transverse to the corrugations which means that when the peaks of the corrugations are properly defined, the valleys are not scored properly. If the corrugations are deep enough to properly score the valleys, then the peaks can be weakened thereby adversely affecting the fire barrier integrity. More particularly, repeated bending cycles may induce failure at the corrugated score lines thereby preventing satisfaction of ASTM test D1399, which requires 5000 bending cycles without failure. These corrugations also present another problem because they increase the surface area of the barrier with a corresponding increase in the convective component of heat transfer, and increase the contact surface of the barrier resulting in an increased conductive component.

SUMMARY OF THE INVENTION

The expansion joint fire barrier of the present invention solves the prior art problems discussed above and provides a distinct advance in the state of the art. More particularly, the barrier hereof provides for economical manufacture and allows rolling and unrolling of a fire barrier with controlled bending while preserving fire barrier integrity.

Broadly, the preferred expansion joint fire barrier includes two, spaced, outer sheets of metallic material with a layer of fire resistant material therebetween to form a barrier body, and two spaced parallel attachment strips respectively coupled with the opposed edges of the barrier body. The outer sheets preferably include a plurality of dimples configured as a plurality of spaced rows for creating respective dimple zones resistant to bending, and for creating respective undimpled areas between the rows of dimples presenting zones of comparative weakness for inducing bending in these areas when the barrier is formed into a non-planar configuration.

BRIEF DESCRIPTION OF THE DRAWINGS

FIG. 3 is a cross sectional view of the barrier of FIG. 2 formed into a U-shaped configuration;

FIG. 4 is a cross sectional view of a third embodiment of the preferred barrier showing a nested arrangement of two, V-shaped barrier layers;

FIG. 5 is a cross sectional view of a fourth embodiment of the preferred barrier showing a nested arrangement of V-shaped and U-shaped barrier bodies; and.

FIG. 6 is a cross sectional view of a second embodiment of the preferred barrier formed into a V-shaped configuration.

DETAILED DESCRIPTION OF THE PREFERRED EMBODIMENT

Figure 1:
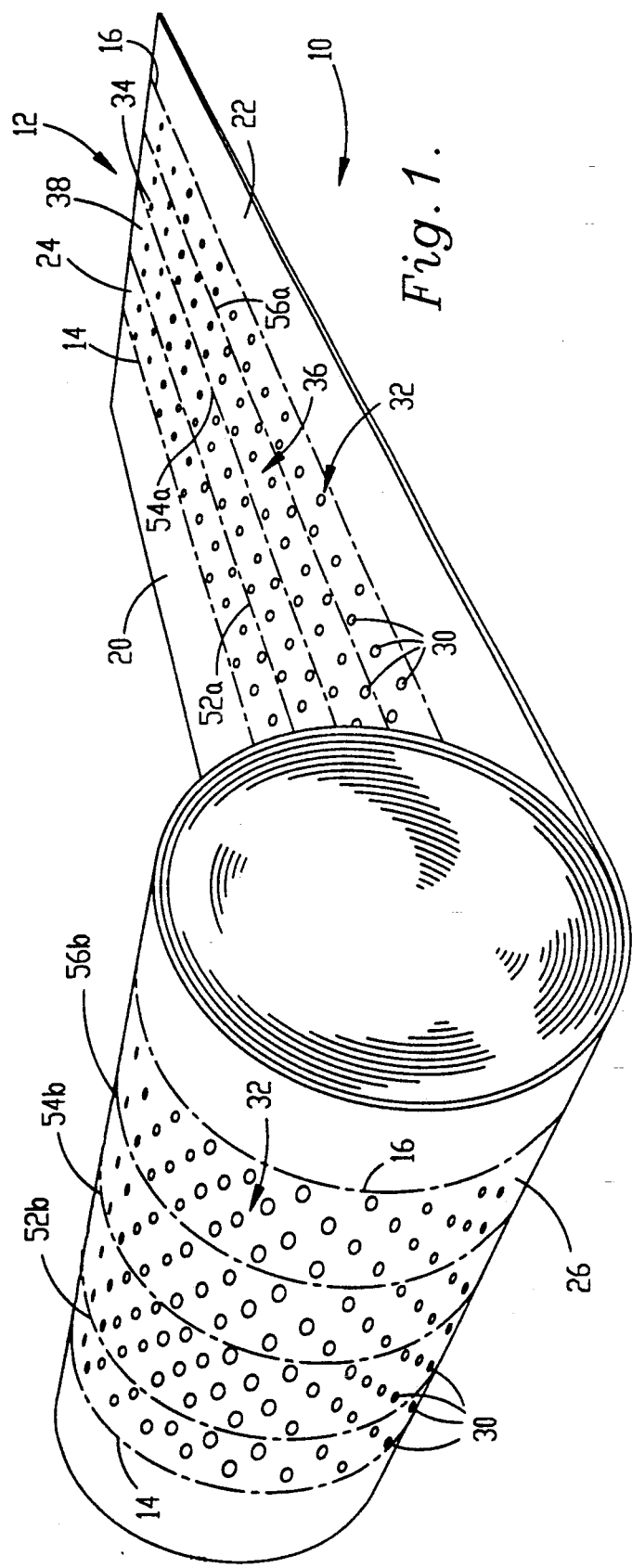
FIG. 1 is a perspective view of the preferred expansion joint fire barrier showing one portion in a planar configuration with the remaining portion formed into a roll.
Figure 2:
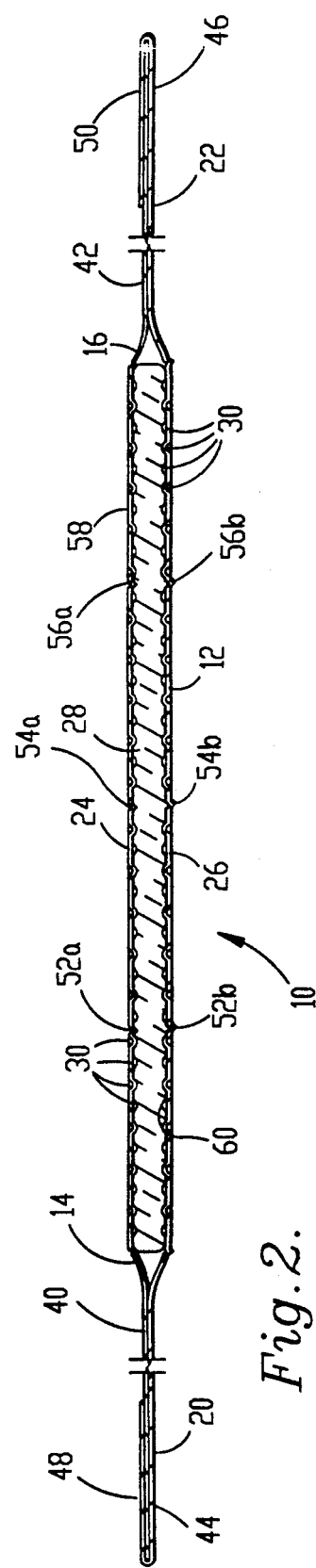
FIG. 2 is a cross sectional view of the preferred barrier in a planar configuration with portions of the attachment strips cut away for drawing clarity.

The drawing figures and in particular FIGS. 1, 2 and 3, illustrate preferred expansion fire barrier 10, which includes fire barrier body 12 presenting respective opposed edges 14 and 16 and parallel, spaced, attachment strips 20 and 22 respectively coupled with edges 14 and 16 and extending outwardly therefrom.

Barrier body 12 includes upper sheet 24, lower sheet 26 spaced from upper sheet 24, and fire resistant layer 28 therebetween. Each sheet 24, 26 is preferably composed of 321A grade stainless steel having a thickness of 0.002 inches or other high temperature resistant composition of matter exhibiting the structural characteristics of sheet metal.

Additionally, each sheet 24, 26 includes a plurality of dimples 30 defined in the surface thereof and extending inwardly toward layer 28, that is, indented relative to the exposed surface for engaging and securing layer 28 between sheets 24 and 26. Preferably, each dimple presents a height approximately equal to its diameter, and the open space between the dimples is approximately equal to the dimple diameter. Dimples 30 are configured into a plurality of rows thereby creating transverse rows 32 and longitudinal rows 34 with the dimples of adjacent rows being offset or staggered as illustrated.

As those skilled in the art will appreciate, the presence of dimples 30 strengthens sheets 24, 26 in the vicinity thereof to provide greater resistance to bending than would otherwise be the case with flat sheet metal. More particularly, the truncated, semi-spherical walls of each dimple 30 provide structural reinforcement that resists bending or creasing, and the dimples 30 making up each row 32, 34 cooperate to provide a zone resistant to bending along the length of the entire dimple row. Those areas of sheets 24, 26 between adjacent ones of rows 32, 34 present respective, elongated undimpled areas 36, 38 as zones of comparative bending weakness relative to the dimpled zones generally defined by rows 32, 34.

In the preferred embodiment, sheet 24 includes flat, marginal portions 40 and 42, and sheet 26 includes flat, marginal portions 44 and 46 extending outwardly from edges 14, 16 respectively. These marginal portions 40-46 form attachment strips 20, 22. As best viewed in FIG. 3, marginal portions 40, 42 are wider than marginal portions 44, 46 in order to present side portions 48 and 50, which are folded over the exposed edges of marginal portions 44, 46 and crimped thereto to form strips 20, 22.

As an alternative, strips 20, 22 can be manufactured of a material having a different composition than that of sheets 24, 26. For example, strips 20, 22 can be manufactured of galvanized sheet metal with the edges thereof crimped to the edges of body 12. This allows for a more economical manufacturing.

Sheets 24, 26 also include score lines for facilitating formation into the desired configuration. More particularly, upper sheet 24 includes score lines 52a, 54a and 56a defined in the exposed surface 58 thereof and lower sheet 26 includes companion score lines 52b, 54b and 56b defined on the interior surface 60 thereof. These score lines are defined preferably in undimpled areas 38 and provide lines of weakness, in addition to the relative weakness provided by undimpled areas 38, along which barrier body 12 bends or creases into the U-shaped concave configuration as illustrated in FIG. 3. It is preferred to place the score lines in these undimpled areas so that they are uniform in depth along the entire lengths thereof. In this way, deeper score lines along one portion and shallower score lines along another are avoided, which has been a problem in the prior art.

Fire barrier layer 28 is preferably composed of a conventional fibrous, ceramic or glass material sufficient so that barrier 10 presents a one to four hour fire rating as defined by ASTM specifications. Such materials are bendable so that when body 12 is placed in a concave configuration, layer 28 easily conforms.

Layer 28 can also be composed of a lead sheet or other lead based composition to act as a radiation barrier. If lead is objectionable for such purposes, then a composition based upon silicon nitrite or equivalent could be used as an alternative radiation barrier. Such a radiation barrier can additionally include a fire barrier composition as well.

Barrier 10 is preferably manufactured as a planar sheet and then rolled into a more compact configuration for shipment. During the rolling process, transverse dimpled rows 32 resist the bending forces while transverse undimpled areas 36 yield to these forces and thereby deform to place barrier 10 in the rolled shape. In this way, any creases or bends are confined to the undimpled areas and thereby controlled in order to prevent random unaligned bends and creases, which can adversely affect the appearance of barrier 10 when it is unrolled.

Upon receipt at the construction site, barrier 10 is unrolled and placed in a spanning relationship over gap 62 of an expansion joint. Barrier body 12 is then creased or bent along score lines 52a,b, 54a,b, and 56a,b into the U-shaped configuration of FIG. 3. In this configuration, barrier body 12 spans gap 62 and attachment strips 20, 22 are secured to upper edges 64, 66 of the expansion joint as illustrated in FIG. 3.

FIG. 4 illustrates fire barrier 70, which is a second embodiment of the present invention. Barrier 70 presents a dual fire barrier construct wherein body 12 presents a V-shaped configuration and includes two of layers 28 with dimpled sheet 72 therebetween.

FIG. 5 illustrates another dual barrier embodiment 80 which includes two fire barrier bodies 12a and 12b. Body 12a is formed into a V-shaped configuration and nested within body 12b presenting a U-shaped configuration as shown. As can be observed in FIG. 5, when barrier 80 is flat, bodies 12a and 12b present the same width. This allows barrier 80 to be economically forced and rolled for shipment as illustrated in FIG. 1, and then formed into the configuration as illustrated.

As those skilled in the art can appreciate, bodies 12a and 12b can present different widths, if desired, and then formed and joined on site. In other words, two separate barriers can be manufactured each with its own pair of attachment strips, and then rolled together for shipment. At the construction site, each barrier is formed into its concave configuration and then installed with the attachment strips 20, 22 congruent and then fastened together.

FIG. 6 illustrates barrier 90 as a third embodiment of the present invention. This embodiment includes dimpled single sheet 24 with one score line 90 presenting a V-shaped configuration, and presents a particularly economical approach for an expansion joint fire barrier in those situations not requiring the level of protection provided by the other embodiments.

As those skilled in the art will appreciate, the present invention encompasses many variations of the preferred embodiments described herein. For example, the dimples could be inverted to extend outwardly if desired and arrangements other than the preferred staggered rows of dimples could be employed if needed. As a final example, some applications may require only the use of a single sheet with the fire resistant layer held in a superposed relationship therewith.

Having thus described the preferred embodiments of the preferred invention, the following is claimed as new and desired to be secured by Letters Patent:

1. An expansion joint barrier comprising:
   a layer of barrier material;
   a sheet of metallic material forming an outer shell covering said layer of barrier material; and
   means for holding said layer and sheet in a superposed relationship,
   said sheet including a plurality of spaced dimples defined in the surface thereof, said dimples being separated by areas of undimpled planar surfaces therebetween.

2. The barrier as set forth in claim 1, further including two of said sheets positioned in a spaced relationship with said layer therebetween thereby presenting said means for holding said layer.

3. The barrier as set forth in claim 1, said layer being bendable, said dimples being configured as a plurality of spaced rows of dimples for creating respective dimple zones resistant to bending and for creating respective undimpled areas between said rows presenting zones of comparative bending weakness relative to said dimple zones for inducing bending of said sheet in said undimpled areas when said barrier is formed into a nonplaner configuration.

4. The barrier as set forth in claim 3, further including two of said sheets positioned in a spaced relationship with said layer therebetween thereby presenting said means for holding said layer.

5. The barrier as set forth in claim 4, said sheets and layer being congruent and presenting opposed parallel edges, said barrier further including a pair of spaced, parallel, attachment strips coupled with said respective edges.

6. The barrier as set forth in claim 5, said sheets further including respective marginal portions extending outwardly from said edges, said strips being formed of said marginal portions.

7. The barrier as set forth in claim 5, said sheets and layer being formed into a concave configuration for placement between respective edges of an expansion joint.

8. The barrier as set forth in claim 7, said concave configuration including a V-shaped configuration in cross-section.

9. The barrier as set forth in claim 7, said concave configuration including a U-shaped configuration in cross-section.

10. The barrier as set forth in claim 7, further including a plurality of score lines in the respective services of said sheets for facilitating the forming thereof into said concave configuration.

11. The barrier as set forth in claim 7, said layer being composed of fire resistant material, said sheets and layer forming a fire barrier body, said barrier further including a pair of said bodies between said strips.

12. The barrier as set forth in claim 11, said bodies being spaced from one another.

13. The barrier as set forth in claim 11, said bodies presenting the same configuration and being in contact with one another.

14. The barrier as set forth in claim 4, said sheets each presenting inner and outer surfaces, said dimples being indented relative to said outer surfaces so that said dimples engage said layer of fire resistant material.

15. The barrier as set forth in claim 1, said layer being composed of radiation resistant material.

16. The barrier as set forth in claim 1 further including two of said sheets positioned in a spaced relationship with said layer therebetween.

17. The barrier as set forth in claim 16, said sheets and layer being congruent and presenting opposed parallel edges, said barrier further including a pair of spaced parallel, attachments strips coupled with said respective edges.

18. The barrier as set forth in claim 17, said sheets and strips being composed of the same material.

19. The barrier as set forth in claim 17, said sheets and strips being composed of dissimilar materials.

20. The barrier as set forth in claim 19, said strips being composed of galvanized steel.

21. The barrier as set forth in claim 20, said sheets being composed of stainless steel.

22. An expansion joint fire barrier comprising:
a sheet of high temperature, fire resistant metal presenting respective opposed edges; and
a pair of spaced, parallel, attachment strips respectively coupled with said edges,
said sheet including a plurality of dimples defined in the surface thereof and being configured to present a concave configuration, said dimples being separated by areas of undimpled planar surfaces therebetween.

23. The barrier as set forth in 22, said configuration including a V-shaped configuration.

24. The barrier as set forth in 22, said metal including stainless steel.

25. The barrier as set forth in claim 22, said sheet and attachment strips being composed of the same material.

26. The barrier as set forth in claim 25, said sheet and strips being composed of stainless steel.

27. The barrier as set forth in claim 22, said sheet and attachment strips being composed of dissimilar materials.

28. The barrier as set forth in claim 27, said sheet being composed of stainless steel, said strips being composed of galvanized steel.

29. An expansion joint fire barrier comprising:
first and second spaced metal sheets;
a bendable layer of fire resistant material positioned between said sheets, said sheets and layer being congruent and cooperatively forming a fire barrier body presenting opposed side edges; and
a pair of spaced, parallel attachment strips respectively coupled with said edges,
each of said sheets including a plurality of dimples defined in the surface thereof and configured as a plurality of spaced rows of dimples for creating respective dimple zones resistant to bending and for creating respective undimpled planar areas between said rows with said undimpled planar areas presenting zones of bending weakness relative to said dimple zones for inducing bending of said sheet in said undimpled planar areas when said barrier is formed into a non-planar configuration,
said body presenting a concave configuration for extending into and spanning the gap in an expansion joint, said sheet including score lines facilitating the formation of said configuration.

* * * * *